US010577845B2

United States Patent
Herczeg

(10) Patent No.: US 10,577,845 B2
(45) Date of Patent: Mar. 3, 2020

(54) CLOSURE DEVICE FOR CLOSING AN ACCESS OPENING IN A MOTOR VEHICLE BODY

(71) Applicant: Dr. Ing. h.c. F. Porsche Aktiengesellschaft, Stuttgart (DE)

(72) Inventor: Gabor Herczeg, Leimen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 119 days.

(21) Appl. No.: 15/617,416

(22) Filed: Jun. 8, 2017

(65) Prior Publication Data

US 2017/0356228 A1    Dec. 14, 2017

(30) Foreign Application Priority Data

Jun. 14, 2016   (DE) .................. 10 2016 110 869

(51) Int. Cl.
  *E05D 15/10*   (2006.01)
  *E05D 15/56*   (2006.01)
  (Continued)

(52) U.S. Cl.
  CPC .............. *E05D 15/10* (2013.01); *B60K 15/05* (2013.01); *E05D 15/101* (2013.01);
  (Continued)

(58) Field of Classification Search
  CPC ... E05D 15/10; E05D 15/101; E05D 15/1047; E05D 15/56; E05D 2015/1028;
  (Continued)

(56) References Cited

U.S. PATENT DOCUMENTS 5,066,062 A    11/1991   Sekulovski
6,808,226 B2 * 10/2004   Hirano ....................... B60J 5/06
                                               292/DIG. 46

(Continued)

FOREIGN PATENT DOCUMENTS

CN    101965301 A    2/2011
DE      4425838 A1   1/1996
(Continued)

OTHER PUBLICATIONS

German Search Report for German Application No. 10 2016 110 869.3, dated Mar. 3, 2017, 10 Pages,. with partial English translation.

(Continued)

*Primary Examiner* — Joseph D. Pape
*Assistant Examiner* — Dana D Ivey
(74) *Attorney, Agent, or Firm* — RatnerPrestia

(57) ABSTRACT

A closure device for closing an access opening in a motor-vehicle body. An inner chamber is accessible via the access opening and the access opening can be closed by a cap element. The cap element is connected to a guide device, which is arranged in the inner chamber and via which the cap element can be adjusted between a closed position and an open position. The guide device is configured such that the cap element executes a pushing movement and a lifting movement as it moves between the closed position and the open position. The cap element, in the open position, is arranged in the inner chamber.

12 Claims, 3 Drawing Sheets

(51) Int. Cl.
    *E05F 15/60* (2015.01)
    *E05F 15/665* (2015.01)
    *B60K 15/05* (2006.01)
    *B60L 53/16* (2019.01)

(52) U.S. Cl.
    CPC ......... *E05D 15/1047* (2013.01); *E05D 15/56* (2013.01); *E05F 15/60* (2015.01); *E05F 15/665* (2015.01); *B60K 2015/0523* (2013.01); *B60K 2015/0538* (2013.01); *B60K 2015/0553* (2013.01); *B60L 53/16* (2019.02); *E05D 2015/1028* (2013.01); *E05D 2015/1039* (2013.01); *E05Y 2900/534* (2013.01)

(58) Field of Classification Search
    CPC ........................ E05D 2015/1039; E05F 15/60; E05F 15/665; B60K 15/05; B60K 2015/0523; B60K 2015/0553; E05Y 2900/534; B60L 53/16
    USPC ....................................................... 296/97.22
    See application file for complete search history.

(56) References Cited

U.S. PATENT DOCUMENTS

| | | | |
|---|---|---|---|
| 8,089,228 | B2 | 1/2012 | Ballard |
| 2009/0289062 | A1 | 11/2009 | Ballard |
| 2010/0252565 | A1* | 10/2010 | Pipp ...................... B60K 15/05 220/825 |
| 2017/0001517 | A1 | 1/2017 | Herrmann et al. |

FOREIGN PATENT DOCUMENTS

| | | |
|---|---|---|
| DE | 4440814 A1 | 5/1996 |
| DE | 19935454 A1 | 3/2001 |
| DE | 102014103642 A1 | 8/2015 |
| DE | 102014016911 A1 * | 5/2016 ............ B60K 15/04 |
| DE | 102014016911 A1 | 5/2016 |
| JP | S62106820 A | 5/1987 |
| JP | H04006475 A | 1/1992 |
| JP | H07270082 A | 10/1995 |
| WO | 2015114154 A2 | 8/2015 |

OTHER PUBLICATIONS

Notification of Reason for Rejection for Japanese Application No. 2017-115834, dated May 29, 2018, 6 pages.
Notification of Reason for Rejection for Japanese Application No. 2017-115834, dated Feb. 5, 2019, 4 pages.
Chinese Office Action for Chinese Application No. 201710438915.4, dated Mar. 1, 2019, with translation, 10 pages.
Second Chinese Office Action for Chinese Application No. 2017104389154, dated Nov. 6, 2019, 6 pages.
Notification of Reason for Rejection for Japanese Application No. 2017-115834, dated Oct. 8, 2019, 4 pages.

* cited by examiner

CLOSURE DEVICE FOR CLOSING AN ACCESS OPENING IN A MOTOR VEHICLE BODY

CROSS-REFERENCE TO RELATED APPLICATIONS

This application claims priority to German Patent Application No. 102016110869.3, filed Jun. 14, 2016, the content of such application being incorporated by reference herein in its entirety.

FIELD OF THE INVENTION

The invention relates to a closure device for closing an access opening in a motor-vehicle body.

BACKGROUND OF THE INVENTION

In the field of motor-vehicle technology, it is known to have closure devices in the form of fuel-tank caps for motor vehicles with an internal combustion engine and in the form of charging-plug caps for electrically driven motor vehicles. The fuel-tank caps or the charging-plug caps are usually arranged on a guide device by means of which the fuel-tank caps or the charging-plug caps can be adjusted to between a closed position and an open position. Depending on the design, the fuel-tank cap or the charging-plug cap, as it is being displaced from the closed position into the open position, is displaced either into an inner chamber, i.e. such that is concealed behind a motor-vehicle body, or in the outward direction, i.e. such that it is visible in front of the motor-vehicle body.

DE 10 2014 103 642 A1, which is incorporated by reference herein, discloses a closure device. The closure device has a cap element which is mounted on the vehicle body in a rotatable manner via bolts. The cap element pivots from the closed position into the open position via rotation about the center axis of the bolts, wherein the cap element executes purely a rotary movement and is pivoted into the inner chamber. The cap element here, in the open position, is arranged more or less perpendicularly to the motor-vehicle body.

The disadvantage with the embodiment described is the deep installation space which is necessary, in a direction perpendicular to the surface area of the motor-vehicle body, in order for the cap element to be arranged in the inner chamber.

SUMMARY OF THE INVENTION

A closure device closes an access opening and, in the open position of a cap element, is arranged in the inner chamber and, in this respect, requires only a low-depth installation space.

According to aspects of the invention, the closure device has a cap element with a guide device acting thereon, wherein the cap element can be adjusted between a closed position and an open position via the guide device and, in the closed position, closes an access opening formed in the vehicle body.

In the closed position, the cap element terminates flush with the motor-vehicle body, wherein the cap element and the motor-vehicle body have arranged between them a seal, which is fastened on the cap element and which seals the inner chamber, in the closed position, against dust and water. In the open position of the cap element, the access opening provides access to an inner chamber, in which may be arranged, for example, a tank filler neck for gas-powered or fuel-powered vehicles, a charging plug for electrically powered vehicles or oil filler necks.

The adjustment between the closed position and open position of the cap element takes place via a guide device, which acts on the rear side of the cap element. The guide device here is designed such that the cap element executes first of all a lifting movement and then a pushing movement as it is being adjusted between the closed position and the open position. The lifting movement displaces the cap element more or less perpendicularly to the surface area of the vehicle body, or to the access opening, and the cap element is therefore shifted in a parallel state into the inner chamber. The subsequent pushing movement displaces the cap element more or less parallel to the vehicle body as a result of which the access opening is freed. In this way, only a low-depth installation space is necessary in the open position of the cap element.

In a preferred configuration, the guide device is made up of a guide rail and of at least one slide, which can be displaced on the guide rail, wherein the slide is connected to the cap element via a pivotable connecting element. The guide device preferably has two slides, which can be displaced on the guide rail and are connected to the cap element via a respective connecting element. As a result of such a configuration of the guide device, the pushing movement takes place via the displacement of the slides on the guide rail, wherein the two slides, the connecting elements and the cap element are displaced together. The lifting movement, which follows the pushing movement during the closing operation, takes place via a pivoting movement of the connecting elements. The displacement of the slides on the guide rail continues here, whereas the displacement of the connecting elements which are connected to the slides in a rotatable manner, is prevented. In this way, the connecting elements each execute a pivoting movement in a parallel state in relation to one another, and this displaces the cap element in a movement direction oriented more or less perpendicularly to the surface area of the vehicle body.

In the open position, preferably the connecting element or the cap element is prestressed by a stressing means, for example a tension spring. The stressing means here has a first end fastened on the cap element and a second end fastened on the connecting element. The connecting element encloses an angle $\alpha$ with the longitudinal axis of the guide rail, it being possible for said angle to be altered in dependence on the position of the connecting element. The stressing means subjects the connecting element or the cap element to a tensile force, which causes the angle $\alpha$ to be decreased and therefore the distance between the cap element and the guide rail to be reduced. This reduces the amount of installation space which is required for mounting the cap element in the open position.

An advantageous embodiment provides a closing stop, which interacts with the guide device, counter to the stressing means. In order to force the cap element to be lifted, the closing stop stops the pushing movement of the connecting element and thus forces the connecting elements to pivot, wherein the angle $\alpha$ increases and a lifting movement of the cap element takes place. The closing stop may be formed, for example, by the motor-vehicle body or by some other component arranged in the inner chamber.

In a preferred configuration, the cap element has arranged on it two guide bodies, which are respectively arranged in a first guide rail and a second guide rail, which is offset in relation to the first guide rail. The guide rails here have a pushing region and a lifting region, by virtue of the fact that the guide rails are, for example, of approximately L-shaped design. During adjustment from the closed position into the open position, the guide bodies thus slide on a lifting region of the L-shaped guide rail, said lifting region running obliquely or perpendicularly in relation to the surface area, and therefore cause the cap element to be lifted. In the pushing region of the guide rail, said region following the lifting region, the cap element is displaced in a parallel state behind the vehicle body.

The guide rails preferably each have a guide groove, each of the latter serving as a guide for the respective guide bodies. The guide bodies are designed preferably in the form of bolts and are arranged, for example, in a respective link plate extending perpendicularly from the surface area of the cap element.

A charging plug is preferably arranged in the inner chamber, as a result of which the traction batteries of electrically driven vehicles can be charged via the charging plug.

An advantageous configuration provides an electric opening drive, which is connected to the guide device, for example the slide, or the cap element. The opening drive is connected to the guide device or the cap element preferably via a pull/push cable, and this makes it possible for movement from the closed position into the open position and for movement from the open position into the closed position to take place.

In a preferred configuration, the guide rail is designed such that the pushing movement takes place essentially parallel to the motor-vehicle body. This means that the angle enclosed by the surface area of the motor-vehicle body and the pushing movement of the cap element does not exceed 20°. This therefore reduces the depth of the installation space which is required in order to accommodate the cap element, in the open position, in the inner chamber.

BRIEF DESCRIPTION OF THE DRAWINGS

The invention will be explained in more detail with reference to drawings, in which.

DETAILED DESCRIPTION OF THE INVENTION

Figure 1:
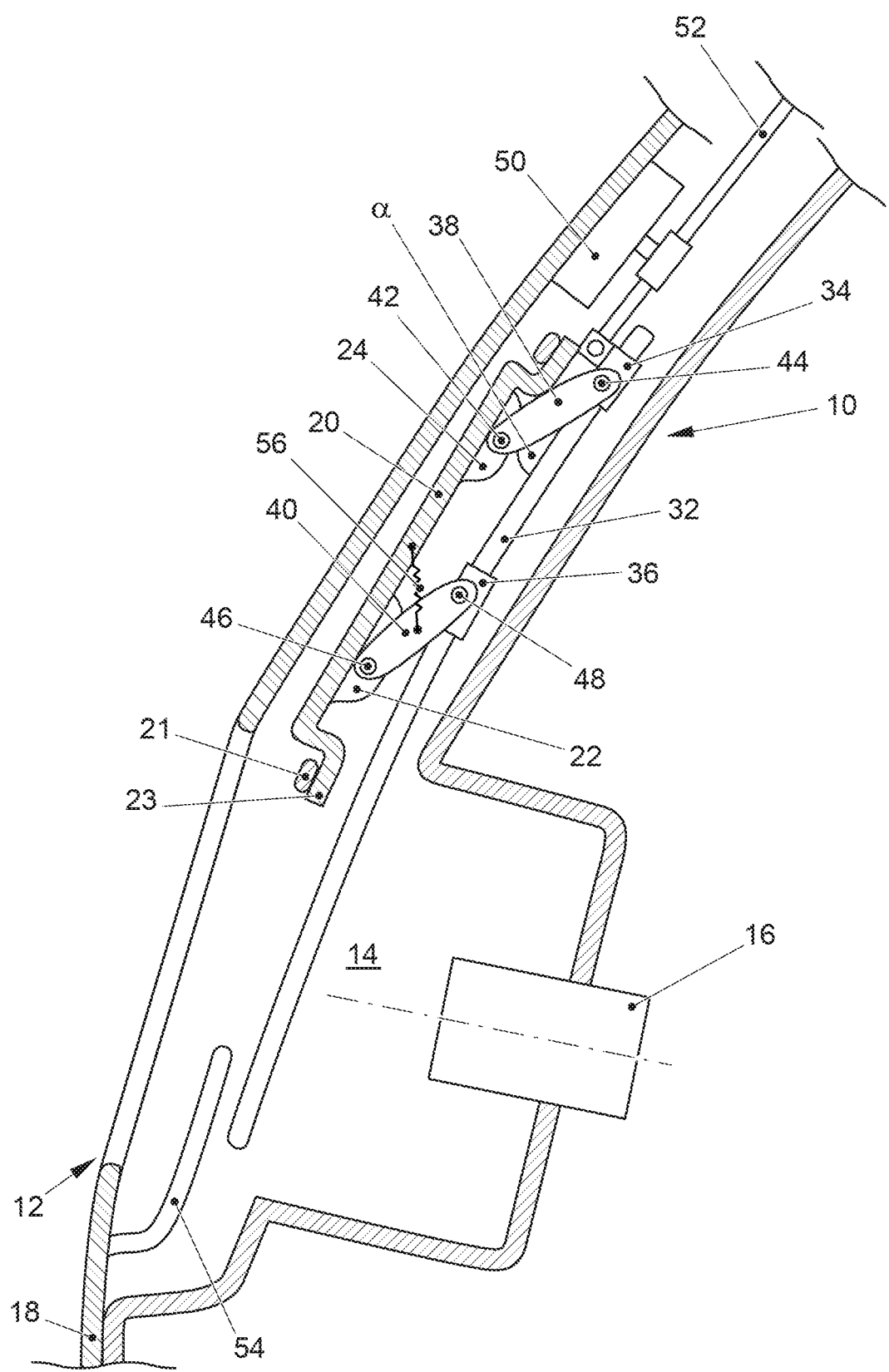
FIG. 1 shows a schematic sectional illustration of a first embodiment of a closure device in the open position.

FIG. 1 shows a schematic view of a first embodiment of a closure device 10 in the open position. The closure device 10 has a cap element 20 and a guide device 30, wherein an access opening 12 formed in a motor-vehicle body 18 can be closed in a dust-tight or water-tight manner by the cap element 20. For the dust-tight or water-tight sealing of the inner chamber 14, the cap element 20 has, running over its circumference, a shoulder 23, on which is arranged a sealing element 21, which, in the closed position, butts against the motor-vehicle body 18. In the open position of the cap element 20, said open position being shown in FIG. 1, an inner chamber 14 with a charging plug 16 arranged therein is accessible from the outside.

The guide device 30 acts on the cap element 20, in so doing defining the movement of the cap element 20 between the closed position and the open position. The guide device 30 is arranged in the inner chamber 14 and has a rod-like guide rail 32, which runs more or less parallel to the main plane of the motor-vehicle body 18. Two slides 34, 36 are arranged in a displaceable manner on the guide rail 32, wherein the two slides 34, 36 are connected to the cap element 20 via a respective pivotable and lever-like connecting elements 38, 40. The connection between the cap element 20 and the connecting element 38, 40 takes place via link plates 22, 24, in each of which is arranged a bolt 42, 46, which engages through both the respective link plates 22, 24 and the respective connecting elements 38, 40, and thus establishes a rotatable connection between the connecting elements 38, 40 and the cap element 20.

The cap element 20 and the connecting element 40 have arranged between them a stressing means 56, which is designed in the form of a spring element, has its first end fastened on the cap element 20 and its other end fastened on the connecting element 40 and subjects the cap element 20 to prestressing in the open position.

The adjustment between the open position and the closed position of the cap element 20 takes place via an electric opening drive 50, which is fixed on the motor-vehicle body 18 and is connected to the slide 34 via a pull/push cable 52.

Figure 2:
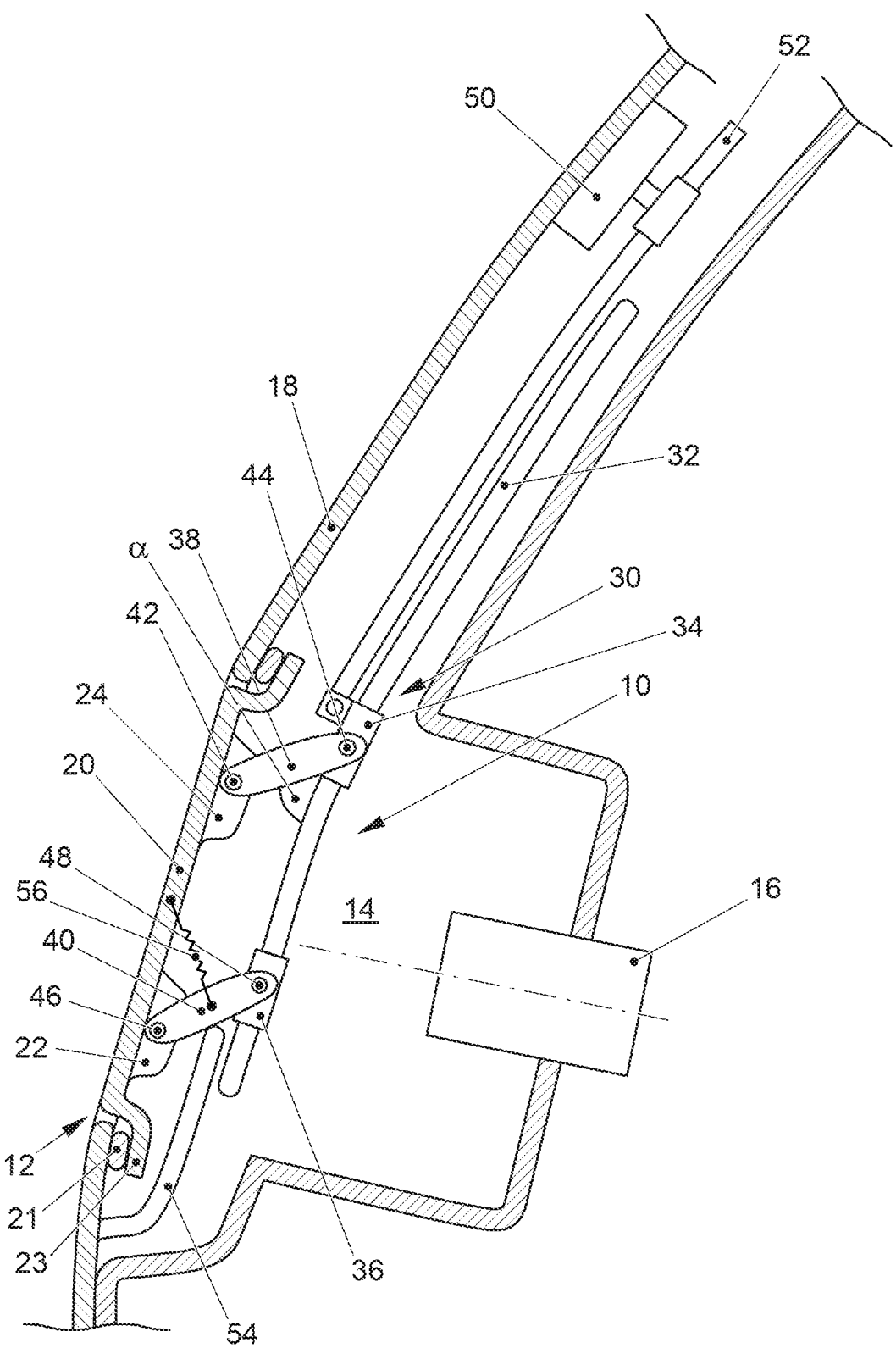
FIG. 2 shows a schematic sectional illustration of the first embodiment of a closure device illustrated in FIG. 1, in the closed position.

FIG. 2 shows the first embodiment of the closure device in the closed position of the cap element 20. The closure device 10 here has the same components as the embodiment shown in FIG. 1.

As the cap element 20 moves from the open position into the closed position, first of all a pushing movement of the cap element 20 takes place, wherein the slides 34, 36, the connecting elements 38, 40 and the cap element 20 are displaced together. The transition between the pushing movement and the lifting movement occurs as a result of the connecting element 40 stopping and butting against a closing stop 54, wherein the slides 32, 36 continue to be displaced by the electric closing drive. The abutment of the connecting element 40 against the closing stop 54 and the displacement of the slides 32, 36 force the connecting element 40 to pivot, and this results in the cap element 20 being lifted into the closed position.

Figure 3:
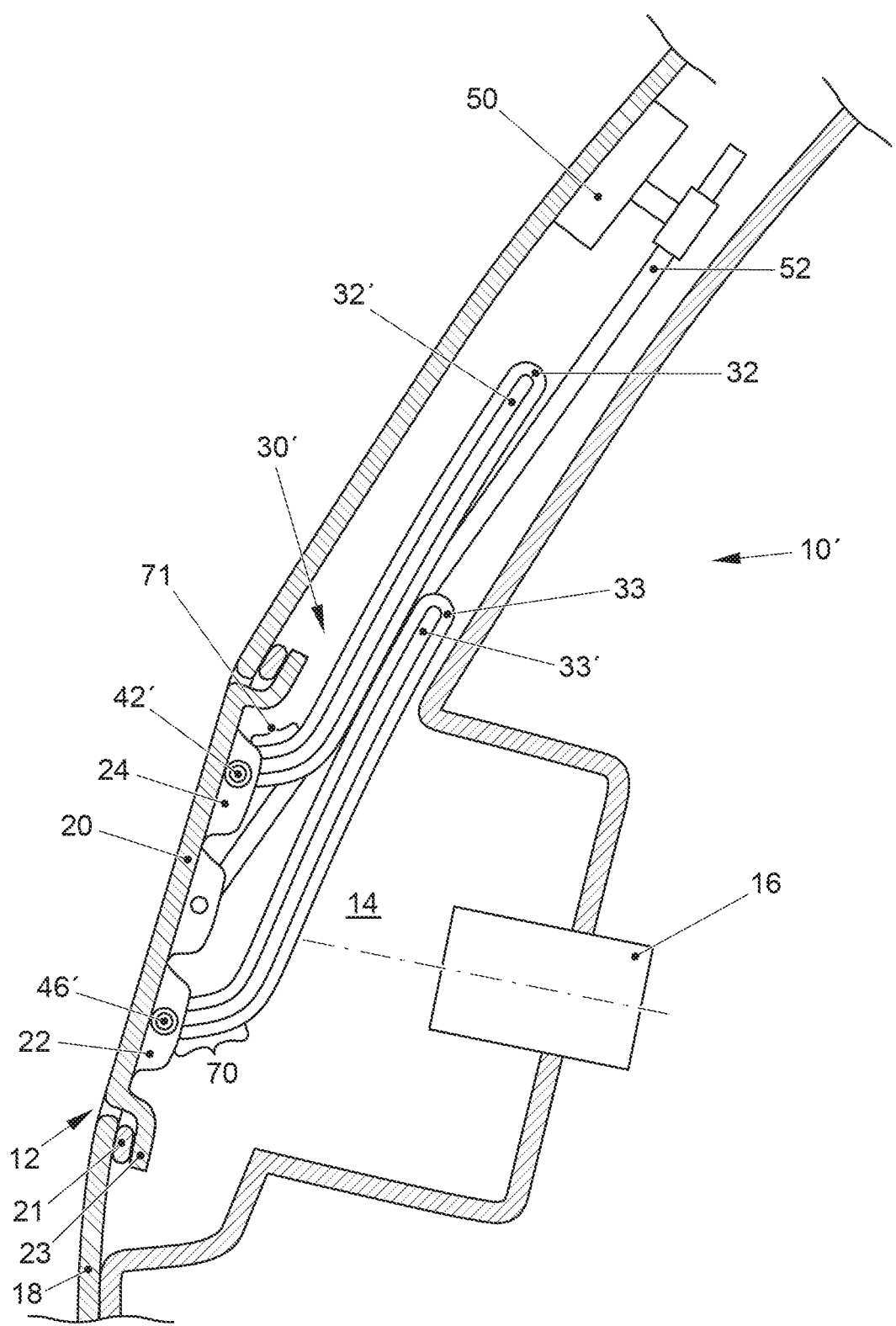
FIG. 3 shows a schematic section illustration of a second embodiment of a closure device in the closed position.

FIG. 3 shows a second embodiment of the closure device 10'. Like the first embodiment from FIG. 1 as well, the closure device 10' has a cap element 20, which is connected to a guide device 30'.

The guide device 30' is made up of a first guide rail 32 and of a second guide rail 33 which is offset in relation to the first guide rail 32, wherein the guide rails 32, 33 each have a guide groove 32', 33', in each of which slides a guide body 42', 46' which is connected to the cap element 20.

In order to provide for the pushing movement and the lifting movement of the cap element 20, the guide rails 32, 33 and the guide grooves 32', 33' have a lifting portion 70, 71 and a pushing region. As in the first embodiment from FIG. 1 as well, the movement between the closed position and the open position takes place via an electric opening drive 50, which is connected to the cap element 20 via a pull/push cable 52.

It is also possible for embodiments other than those described to fall within the scope of protection of the main claim. It is possible for example for the guide device or the cap element 20 to be of a different design.

What is claimed is:

1. A closure device for closing an access opening in a motor-vehicle body, the closure device comprising:
an inner chamber that is accessible via the access opening;
a cap element configured to close the access opening; and a guide device connected to the cap element, the guide device being arranged in the inner chamber and via which the cap element can be adjusted between a closed position and an open position, wherein the cap element, in the open position, is arranged in the inner chamber, wherein the guide device is configured such that the cap element executes a pushing movement and a lifting movement as it moves between the closed position and the open position, wherein the guide device has a first guide rail and a second, offset guide rail, and wherein the cap element has two guide bodies, which are each guided on the respective guide rail.

2. The closure device as claimed in claim 1, wherein the guide rails have a pushing region and a lifting region.

3. The closure device as claimed in claim 1, wherein the guide rails have guide grooves, in which the guide bodies engage.

4. The closure device as claimed in claim 1, wherein the guide bodies are bolts.

5. The closure device as claimed in claim 1, wherein the guide rails are configured such that the pushing movement takes place substantially perpendicular to the motor-vehicle body.

6. The closure device as claimed in claim 1, wherein a charging plug for a traction battery is arranged in the inner chamber.

7. The closure device as claimed in claim 1, further comprising an electric opening drive, which is connected to the guide device or the cap element.

8. The closure device of claim 1, further comprising an electric opening drive, which is connected to the guide device or the cap element via a pull/push cable.

9. The closure device as claimed in claim 1, wherein the pushing movement and the lifting movement are orthogonal to each other.

10. A closure device for closing an access opening in a motor-vehicle body, the closure device comprising:

an inner chamber that is accessible via the access opening;

a cap element configured to close the access opening; and a guide device connected to the cap element, the guide device being arranged in the inner chamber and via which the cap element can be adjusted between a closed position and an open position, wherein the cap element, in the open position, is arranged in the inner chamber, wherein the guide device is configured such that the cap element executes a pushing movement and a lifting movement as it moves between the closed position and the open position, wherein the guide device has a guide rail and at least one slide, which can be displaced on the guide rail, wherein the at least one slide is connected to the cap element via at least one pivotable connecting element, wherein the connecting element is prestressed into the open position of the cap element by a stressing means.

11. The closure device as claimed in claim 10, wherein the guide device has two slides, which can be displaced on the guide rail, wherein each slide is connected to the cap element via a respective connecting element.

12. The closure device as claimed in claim 10, further comprising a closing stop, which interacts with the guide device, counter to the stressing means, such that, during the closing operation, the cap element is lifted into the access opening.

* * * * *